US011429606B2

(12) United States Patent
Petride et al.

(10) Patent No.: US 11,429,606 B2
(45) Date of Patent: Aug. 30, 2022

(54) DENSIFICATION OF EXPRESSION VALUE DOMAIN FOR EFFICIENT BITMAP-BASED COUNT(DISTINCT) IN SQL

(71) Applicant: ORACLE INTERNATIONAL CORPORATION, Redwood Shores, CA (US)

(72) Inventors: Sabina Petride, Tracy, CA (US); Mohamed Ziauddin, Pleasanton, CA (US); Praveen T.J. Kumar, Nashua, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/726,597

(22) Filed: Dec. 24, 2019

(65) Prior Publication Data

US 2021/0191941 A1    Jun. 24, 2021

(51) Int. Cl.
*G06F 16/00* (2019.01)
*G06F 16/2453* (2019.01)
*G06F 16/22* (2019.01)

(52) U.S. Cl.
CPC .... *G06F 16/24539* (2019.01); *G06F 16/2237* (2019.01)

(58) Field of Classification Search
CPC .............. G06F 16/284; G06F 16/2237; G06F 16/24534; G06F 16/24537; G06F 16/24539; G06F 16/24556; G06F 16/2228; G06F 16/24542; G06F 16/24549; G06F 16/2462; G06F 16/289; G06F 11/1435; G06F 12/023; G06F 16/1774; G06F 16/2246; G06F 16/2438; G06F 16/244; G06F 16/24532;
(Continued)

(56) References Cited

U.S. PATENT DOCUMENTS 8,290,931 B2   10/2012  Hong
10,503,737 B1  12/2019  Manville
(Continued)

OTHER PUBLICATIONS

Su, U.S. Appl. No. 14/818,663, filed Aug. 5, 2015, Notice of Allowance, dated Aug. 2, 2017.
(Continued)

*Primary Examiner* — Shyue Jiunn Hwa
(74) *Attorney, Agent, or Firm* — Hickman Becker Bingham Ledesma LLP

(57) ABSTRACT

Techniques are provided for bitmap-based computation of a COUNT(DISTINCT) function, where the bitmaps are generated based on ranks of target expression values. According to an embodiment, the ranks are computed using the DENSE_RANK function. The bitmaps may be maintained in a materialized view. Bitmap data that represents the ranks for target expression values occurring in data for a given group is divided across multiple bucket bitmaps, each corresponding to a distinct sub-range of the ranks. According to an embodiment, target expression value ranks are computed relative to partitions of the target expression values. When these partitions correspond to a subset (not necessarily strict) of the target query grouping keys for a query rewrite, the resulting bitmaps allow computation of multiple levels of aggregation from the single set of bitmaps.

26 Claims, 6 Drawing Sheets

(58) Field of Classification Search
CPC ......... G06F 16/24544; G06F 16/24553; G06F 16/24557; G06F 16/2456; G06F 16/24578; G06F 16/2465; G06F 16/258; G06F 16/27; G06F 16/972; G06F 2201/80; G06F 2201/84; G06F 2212/1016; G06F 3/0481; G06F 3/0482; G06F 7/57; G06F 8/24; G06F 8/38; G06F 8/54; G06F 9/451; G06F 9/543; G06F 16/9535; G06F 16/951; G06F 16/3329; G06F 40/30; G06F 16/248; G06F 16/3322; G06F 16/93; G06F 9/453; G06F 16/285; G06F 16/334; G06F 40/211; G06F 16/243; G06F 16/3334; G06F 40/205; G06F 16/33; G06F 16/337; G06F 16/90335; G06F 16/48; G06F 16/245; Y10S 707/99933; Y10S 707/957; Y10S 707/99942; Y10S 707/99943; Y10S 707/99932

See application file for complete search history.

(56) References Cited

U.S. PATENT DOCUMENTS

| | | | |
|---|---|---|---|
| 2002/0095421 A1* | 7/2002 | Koskas | G06F 16/284 |
| 2006/0085592 A1 | 4/2006 | Ganguly et al. | |
| 2009/0244633 A1* | 10/2009 | Johnston | H04N 1/648 |
| | | | 358/3.23 |
| 2009/0281985 A1 | 11/2009 | Aggarwal | |
| 2009/0327255 A1* | 12/2009 | Larson | G06F 16/8365 |
| 2012/0323962 A1 | 12/2012 | He | |
| 2013/0166557 A1 | 6/2013 | Fricke | |
| 2015/0070397 A1* | 3/2015 | Miller | G09B 29/106 |
| | | | 345/660 |
| 2017/0024387 A1 | 1/2017 | Su | |
| 2018/0121504 A1 | 5/2018 | Bienert et al. | |
| 2019/0130040 A1* | 5/2019 | Ma | G06F 16/244 |
| 2019/0197162 A1 | 6/2019 | Chiang | |
| 2019/0303479 A1 | 10/2019 | Behm | |
| 2021/0109930 A1* | 4/2021 | Petride | G06F 16/2393 |

OTHER PUBLICATIONS

Flajole et al., "HyperLogLog: the analysis of a near-optimal cardinality estimation algorithm", 2007 Discrete Mathematics and Theoretical Computer Science (DMTCS), Nancy, France, 20 pages.

Finnerty, Jim, "Avoiding the OLAP Cliff for Count Distinct Queries in Vertica", Big Data, Vertica 7, dated Mar. 5, 2014, 6 pages.

Durand et al., "Loglog Counting of Large Cardinalities (Extended Abstract)", G. Di Battista and U. Zwick (Eds.): ESA 2003, LNCS 2832, pp. 605-617, 2003, 13 pages.

'Database SQL Reference', DENSE_RANK, Oracle Help Center, Oracle Database Online, Oracle Database Online Documentation, 10g Release 2 (10.2), 2019, 3 pages.

"Learn Oracle COUNT() Function by Practical Examples", Oracle Tutorial, Oracle COUNT, https://www.oracletutorial.com/oracle-aggregate-functions/oracle-count/, Oct. 28, 2018, 7 pages.

"Other Builtins (Using the GNU Compiler Collection (GCC))", https://gcc.gnu.org/onlinedocs/gcc/Other-Builtins.html, accessed on Oct. 25, 2021, 16 pages.

"Population Count—Chessprogramming Wiki," https://www.chessprogramming.org/Population_Count, accessed on Oct. 26, 2021, 16 pages.

Antoshenkov, G. et al., "Byte-aligned bitmap compression", in Proceedings DCC '95 Data Compression Conf, vol. 1, p. 476, 1995, 1 page.

Barzan Mozafari, "Approximate Query Engines: Commercial Challenges and Research Opportunities", SIGMOD 2017, 4 pages.

"Hamming weight", Wikipedia, https://en.wikipedia.org/wiki/Hamming_weight, page last updated Oct. 19, 2021, 9 pages.

'Database Data Warehousing Guide', 25 Using Parallel Execution, Oracle Help Center, Oracle Database Online Documentation, 10g Release 2 (10.2), Apr. 19, 2006, 51 pages.

Wu, Kesheng, et al., "Optimizing Bitmap Indices With Efficient Compression", ACM Trans, on Databse Sys, vol. V, No. N, Jul. 2005, 36 pages.

Flajolet, Phillipe, et al., "HyperLogLog: the analysis of a near-optimal cardinality estimation algorithm", 2007 DMTCS Proceedings, Iss. 1, pp. 137-156, Analysis of Algorithms Conf. 2007, 18 pages.

Lemire, Daniel, et al., "Consistently faster and smaller compressed bitmaps with Roaring", Wiley online library, Software: Practice and Experience, vol. 46, Iss. 11, pp. 1547-1569, Nov. 2016, 24 pages.

Mula, Wojciech, et al., "Faster Population Counts Using AVX2 Instructions", arXiv:1611.07612v9, Sep. 5, 2018, 10 pages.

Randolf, E. G., "Oracle related stuff: Hash Aggregation", https://oracle-randolf.blogspot.com/2011/01/hash-aggregation.html, Jan. 16, 2011, 37 pages.

Wang, Jianguo, et al., "An Experimental Study of Bitmap Compression vs. Inverted List Compression", DOI: http://dx.doi.org/10.1145/3035918.3064007, SIGMOD '17, May 14, 2017, 16 pages.

Wu, Kesheng, et al., "Compressing bitmap indexes for faster search operations", Comp. Science, Proceedings 14th Intl Conf. on Scientific and Statistical Database mgmt, published 2002, 10 pages.

Chen, Zhen, et al., "A Survey of Bitmap Index Compression Algorithms for Big Data", Tshinghua Science and Tech, Issn 1007-0214 11/11, pp. 100-115, vol. 20, No. 1, Feb. 2015, 16 pages.

Petride, U.S. Appl. No. 16/653,639, filed Oct. 15, 2019, Non-Final Rejection, dated Sep. 2, 2021.

Zhu et al., "DMVI: Developing a Dynamic Materialized View Index for Efficiently Discovering Usable Views for Progressive Queries", Proceedings of the Conference of the Centre for Advanced Studies on Collaborative Research, Nov. 2012, 16 pages.

* cited by examiner

FIG. 2

202 — A DATABASE MANAGEMENT SYSTEM MAINTAINING BITMAP DATA THAT COMPRISES ONE OR MORE BITMAPS, WHEREIN, FOR EACH BITMAP OF THE ONE OR MORE BITMAPS, EACH BIT OF THE RESPECTIVE BITMAP REPRESENTS A RESPECTIVE RANK THAT CORRESPONDS TO A RESPECTIVE UNIQUE POSSIBLE VALUE OF A PARTICULAR EXPRESSION FROM A PARTICULAR SET OF DATA, WHERE ONE OR MORE HIT RANKS CORRESPOND TO VALUES, OF THE PARTICULAR EXPRESSION, THAT EXIST IN THE PARTICULAR SET OF DATA, AND WHERE, WITHIN THE BITMAP DATA, ONE OR MORE BITS THAT CORRESPOND TO HIT RANKS ARE SET AND THE OTHER BITS, WITHIN THE BITMAP DATA, ARE UNSET

204 — THE DATABASE MANAGEMENT SYSTEM RECEIVING A QUERY THAT REQUESTS A NUMBER OF DISTINCT VALUES, OF THE PARTICULAR EXPRESSION, IN THE PARTICULAR SET OF DATA

206 — THE DATABASE MANAGEMENT SYSTEM REWRITING THE QUERY TO PRODUCE A REWRITTEN QUERY THAT IS CONFIGURED TO COMPUTE THE NUMBER OF DISTINCT VALUES BY COUNTING BITS, IN THE BITMAP DATA, THAT ARE SET

208 — THE DATABASE MANAGEMENT SYSTEM EXECUTING THE REWRITTEN QUERY

TABLE "T1" 300

DENSIFICATION OF EXPRESSION VALUE DOMAIN FOR EFFICIENT BITMAP-BASED COUNT(DISTINCT) IN SQL

CROSS-REFERENCE TO RELATED APPLICATIONS; BENEFIT CLAIM

This application is related to each of the following, the entire contents of each of which is hereby incorporated by reference as if fully set forth herein:

U.S. Pat. No. 9,852,185, titled "Approximate Distinct Counting in a Bounded Memory", filed Aug. 5, 2015, and issued Dec. 26, 2017 (referred to herein as the "Approximate Distinct Counting Application"); and U.S. patent application Ser. No. 16/653,639, titled "Bitmap-Based Count Distinct Query Rewrite in a Relational SQL Algebra", filed Oct. 15, 2019 (referred to herein as the "Bitmap-Based Count Application").

FIELD OF THE INVENTION

The present invention relates to processing queries in a database management system, and, more specifically, to tracking, within bitmap data, distinct values in database data using ranks of the values, and rewriting the queries to use the bitmap data in order to determine distinct counts for the data.

BACKGROUND

Structured query language (SQL) is a domain-specific language used in programming to manage data held in a relational database management system (RDBMS). SQL includes data query commands for accessing data records from the RDBMS. SQL includes several different types of functions for evaluating data records, such as a COUNT function that returns a number of records that have a value for an attribute. For example, the following query includes the COUNT function: SELECT COUNT(Color) from TABLE1. This example COUNT function would return the number of records from TABLE1 that have any value for the Color attribute.

Another SQL function is a COUNT(DISTINCT) function that counts the number of distinct values for an attribute. For example, TABLE1 contains 10 records that have values for the Color attribute, and those ten records have one of three color values [Red, Green, Blue]. Under these circumstances, the query SELECT COUNT(Color) from TABLE1 would return the value 10 (because 10 rows have color values). The query SELECT COUNT (DISTINCT Color) from TABLE1 would return the value 3, which represents the number of unique Color values from the 10 records in TABLE1.

Typically, the target of the COUNT(DISTINCT) expression is a set of tuples. The set of tuples may comprise values retrieved from database tables, and/or comprise values that are created by performing operations on values retrieved from database tables. Each value in a tuple corresponds to a different attribute. The expression that identifies a target of a given COUNT(DISTINCT) operation is referred to herein as the "target expression". The target expression may identify a single attribute (e.g. Color), or a more complex expression comprised of multiple attributes (e.g., Firstname&''&MiddleName&''&Lastname). Within a tuple, the value that corresponds to a target expression is referred to herein as the "target expression value" for the tuple. For example, for the query SELECT COUNT DISTINCT(Color), the target expression is Color. The target expression value for a given row may be Red, Green, or Blue.

Generally, implementing a COUNT(DISTINCT) function on a set of tuples includes first sorting the set of tuples based on the target expression values for the tuples, and then removing or discounting tuples that have duplicate target expression values. For example, the 10 rows of TABLE1 may be sorted based on the color values, so that all rows with Blue are followed by all rows with Green, which are followed by all rows with Red. Elimination of duplicates would leave one row with Blue, one row with Green, and one row with Red.

By sorting the set of tuples based on their target expression values, tuples with duplicate target expression values may be easily identified and then discounted or removed from the set of tuples. The number of target expression values in the remaining set of tuples would then represent a distinct count of the target expression values. However, approaches that involve sorting tuples based on target expression values generally require significant processing resources, especially when the set of tuples represents a large set of data. Specifically, as the size of the set of tuples being sorted increases, the processing resources required to sort the tuples increases super-linearly, i.e., by a scale of N log N. Furthermore, sort-based approaches have the potential of spilling out of main memory during the sorting operation, further increasing the processing power required to complete the operation.

Another approach to implementing a COUNT(DISTINCT) function involves hashing the set of tuples according to the respective target expression values, and then removing or discounting duplicates within each hash partition. Implementing COUNT(DISTINCT) using hashing may be less computationally intensive than a sorting approach, and also may scale better for a sufficiently large set of tuples. Nevertheless, the hashing approach still consumes large amounts of processing resources in order to affect hashing on a target set of tuples, e.g., to manage the hash table structure. As with sort-based approaches, hash-based approaches also have the potential of spilling out of main memory during the hashing operation.

Another approach is to approximate COUNT(DISTINCT) computations, e.g., as described in the Approximate Distinct Counting Application. (See also "Approximate Query Engines: Commercial Challenges and Research Opportunities", by Barzan Mozafari, Sigmod 2017, the entire contents of which is hereby incorporated by reference as if fully set forth herein.) However, approximating the distinct count of a target expression, of course, does not provide an exact count of the distinct values of the target expression within the target tuple set.

Furthermore, sort-based approaches, hash-based approaches, and approximating approaches lack the ability to combine (or "roll up") COUNT(DISTINCT) computations from lower levels of aggregation to higher levels of aggregation, which reduces the utility of the COUNT(DISTINCT) results.

As such, it would be beneficial to implement the COUNT (DISTINCT) function such that the implementation is not resource-intensive, notwithstanding the size of the target set of tuples. Furthermore, it would be beneficial for such an approach to work over a variety of target expression value types, to provide an exact count of the distinct values of the target expression, and to allow rolling up COUNT(DISTINCT) computations from lower levels of aggregation to higher levels of aggregation.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 depicts a flowchart for using rank-based bitmaps to implement a COUNT(DISTINCT) function in a query.

DETAILED DESCRIPTION

Figure 1:
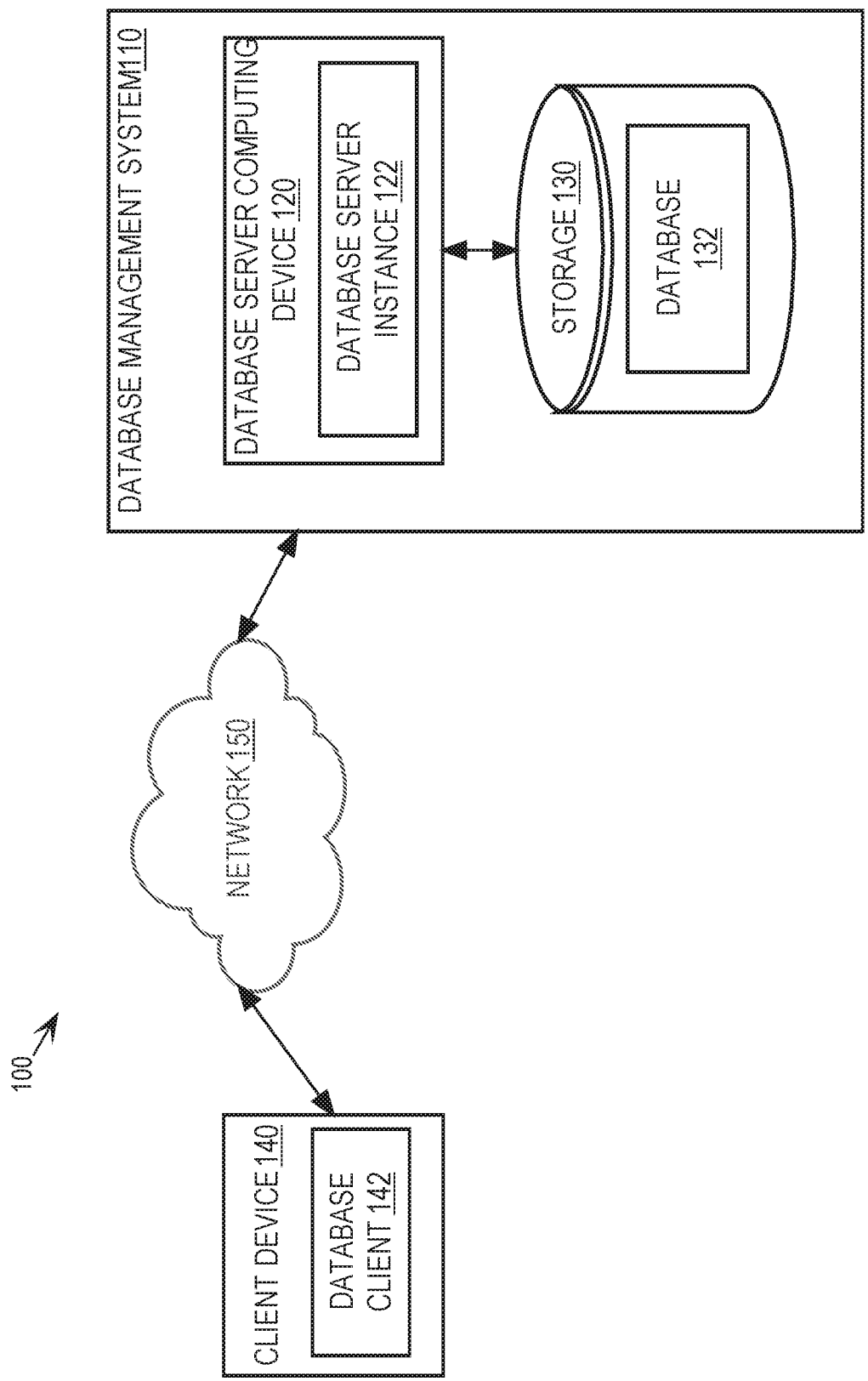
FIG. 1 is a block diagram that depicts an example network arrangement for an example database management system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

According to one or more embodiments described herein, a database management system (DBMS) generates and maintains bitmap data to implement a DISTINCT(COUNT) function for one or more target expressions. The bitmaps in the bitmap data are constructed using ranks of target expression values (e.g., using a DENSE_RANK SQL function) and, as such, the bitmaps may be constructed for a variety of target expression value types. Thus, bitmaps may be generated based on any data type for which ranks can be computed, which includes values of the following types (both discrete and non-discrete, as applicable): NUMBER, FLOAT, DOUBLE, RAW, CHAR, VARCHAR2, DATE, TIMESTAMP, etc. By using ranks of target expression values, rather than the target expression values themselves, techniques described herein map the non-discrete values to respective discrete values. Furthermore, utilization of ranks to build bitmaps for target expression values ensures that each bit, of the bitmaps, corresponds to a value that occurs in the target data.

According to an embodiment, ranks for target expression values are computed relative to partitions of the target expression values defined by grouping criteria that comprises target query grouping keys—which is, according to an embodiment, a superset of the grouping keys. Partitioning the target expression values for the purpose of ranking reduces the overhead of ranking but also reduces the applicability of the resulting bitmap data. Furthermore, according to an embodiment, bitmap data that is maintained for a given group is bucketized, which reduces the overall sizes of individual bitmaps and also allows for selective materialization of bitmaps based on data that is to be represented for a given group. The bitmap data may be configured to allow computation of multiple levels of aggregation from a single set of bitmaps, which increases the applicability of the bitmaps to a wider range of queries and, as such, increases the utility of the resources spent creating the bitmaps.

According to an embodiment, bitmaps generated for a given target expression are maintained in a materialized view (MV), which allows queries to use the bitmaps for execution of COUNT(DISTINCT) functions using MV functionality implemented by the DBMS. MVs that store rank-based bitmaps generally have considerably fewer rows than MVs that maintain bitmaps constructed using a technique described in the Bitmap-Based Count Application, which is referred to herein as the "discrete value bitmap technique" and is described in further detail below. Also, the rank-based bitmaps are denser and more easily compressed than the potentially sparse bitmaps of the discrete value bitmap technique. Improvements to the overall size of the rank-based MVs translate into better runtimes for rewritten queries and smaller storage requirements for the MVs.

THE DISCRETE VALUE BITMAP TECHNIQUE

The Bitmap-Based Count Application referred to above describes a discrete value bitmap technique that involves bitmap-based COUNT(DISTINCT) computation of a numerical target expression with discrete values. The discrete value bitmap technique computes a bitmap representation of the target expression of a COUNT(DISTINCT) function over a target set of tuples. The technique further bucketizes the value domain of a target expression into equally-sized bucket bitmaps in the bitmap data. The Bitmap-Based Count Application describes embodiments executed in SQL, where bitmaps are stored in MVs, and are used to execute queries with the aid of an MV-based query rewrite.

To illustrate, an example database management system (DBMS) 110, depicted in the example network arrangement 100 of FIG. 1, receives, from a database client 142 executing on a client device 140, the following query ("Q1") over a database 132 managed by a database server instance 122 (where "T" represents any sub-query):

(Q1)
SELECT COUNT(DISTINCT expression)
FROM T
GROUP BY key_1, . . . , key_n

Using the discrete value bitmap technique, an MV of the following form is created with the number of grouping keys (p) being equal to or greater than the number of grouping keys (n) in the COUNT(DISTINCT) queries that are targeted to be rewritten.

CREATE MATERIALIZED VIEW MV1 AS
SELECT BITMAP_BUCKET_NUMBER(expression) as bktno,
 BITMAP_CONSTRUCT_AGG(BITMAP_BIT_POSITION(expression))
 as bitmap, key_1, ... ,key_p
FROM T
GROUP BY key_1, ... ,key_p, BITMAP_BUCKET_NUMBER(expression)

Note that the bitmap functions are described in further detail below. The resulting MV1 groups the rows in T by a set (potentially a superset, i.e., p>=n) of the COUNT(DISTINCT) query grouping keys, and on a bucket number. For each group in MV1, a bitmap data represents the unique values of the target expression. MV1 has as many rows as there are combinations of distinct keys (key_1, . . . , key_p) and bucket numbers.

A bitmap is a data structure that may be used to map boolean information for a set of values ("bitmap domain") into a relatively compact representation. For example, for a given target expression, the bitmap domain represents all possible distinct values of the expression, and each bit in the bitmap corresponds to one of those distinct values. For any given value of the expression, the corresponding bit in the bitmap represents a boolean-type value that indicates whether, in a particular set of data, the value exists (i.e., with a "set" or "true" bit, e.g., with a value of 1) or does not exist (i.e., with an "unset" or "false" bit, e.g., with a value of 0). However, when the value domain for a target expression is very large, the size of the bitmap is correspondingly large.

To illustrate, the target expression for an example bitmap is "age", which has a range of possible values from 0 to 130. A bitmap is created to indicate the distinct age values in a particular table (TableX). If the "age" column of TableX only has three distinct ages (21, 31 and 33), then the bitmap will have set bits that correspond to the ages 21, 31 and 33, while the remaining bits in the bitmap are unset. In this example, the bitmap is very sparse in that the majority of the bits in the bitmap are unset.

The Bitmap-Based Count Application proposed a mechanism for the MV rewrite to rewrite the Q1 to produce a rewritten query, "Q1R_0", as follows:

```
(Q1R_0)
SELECT SUM(agg)
FROM
( SELECT BITMAP_COUNT(BITMAP_OR_AGG(bitmap)) as agg,
    key_1, . . . , key_n, bktno
  FROM MV1
  GROUP BY key_1, . . . ,key_n, bktno
)
GROUP BY key_1, . . . ,key_n.
```

In Q1R_0, the rows in MV1 are grouped by the query grouping keys (key_1, . . . , key_n), which is a subset of the MV1 grouping keys (key_1, . . . , key_p) if p>n. The grouping by the subset of keys represents the rollup of bitmap data. The bitmap data for each group is divided into one or more bucket bitmaps, with each bucket bitmap of each group corresponding to a respective bucket number. For each group that contributes to a given result of the COUNT(DISTINCT) function in Q1, bitmaps with the same bucket number are OR-ed together, where their 1-bit count is computed as agg shown in Q1R_0. Finally, all such values are added up across bucket bitmaps that share the grouping keys, as SUM(agg) shown in Q1R_0. Specifically, a final count of set bits in the bitmaps for a given group corresponds to the exact number of distinct values, belonging to the group, for the target expression.

As indicated above, each group that can be formed by a combination of keys in MV1 has its own set of bucket bitmaps, which, collectively, represent the values of the target expression for that group. To create the bucket bitmaps for each group, the target expression value in each row is scaled relative to the bucket bitmap. Taking the bitmap data for a particular group in MV1 as an example, for a bucket bitmap size of 16000, an expression value of 1 for the particular group would be represented by bit position 1 in a first bucket bitmap of the bitmap data, while a value of 16001 for the group would be represented by bit position 1 in a second bucket bitmap of the bitmap data.

Sets of bucket bitmaps, representing corresponding ranges of target expression values, are maintained in MV1 for each group. Thus, the bitmaps corresponding to sets of grouping keys can be rolled up to produce bitmaps for subsets of the grouping keys. Specifically, corresponding bucket bitmaps, across groups, can be OR-ed together to represent the unique values that the target expression takes across the groups that have values in the range of the corresponding bucket bitmaps.

One advantage of the discrete value bitmap technique is that both bitmap OR-ing and set-bit counting are fast operations, which are natural to parallelize and roll up. Further, as the size of the target set of tuples grows, the time it takes to calculate COUNT(DISTINCT) for the target expression is linear, which is a significant improvement over the sort-based approach (N log N). While this technique significantly improves COUNT(DISTINCT) computation time in a SQL engine, the technique has some limitations.

One limitation is that the target expression must be numeric with discrete values so that each value can be correctly mapped to a bit position in the bucket bitmaps. There are, however, many customer workloads that compute COUNT(DISTINCT) on non-discrete numeric target expressions (such as floats), or on non-numeric target expressions (such as dates, timestamps, or char-type attributes).

Unlike approximate COUNT(DISTINCT) approaches, bitmap-based approaches cannot lose precision, and therefore need to be able to handle very large bitmaps, i.e., for target expressions with very large value domains. Bucketization manages large value domains by splitting the input across discrete value ranges that are then represented by respective bucket bitmaps. The split may be dynamic in the sense that a given bucket bitmap can have no materialization unless at least one value in the input falls within the given bucket bitmap. However, depending on the data, the number of bucket bitmaps can still be very large, resulting in MVs with very large numbers of rows. This is referred to herein as the bitmap MV row expansion problem.

Further, even if the number of bucket bitmaps is not prohibitively large, the bitmaps themselves can be relatively large. Compression schemes can be applied to reduce bitmap size, which can be very effective in reducing the size of data that must be maintained for the bitmaps. However, compression comes at a non-trivial cost, especially during bitmap creation, with additional computation costs paid during MV refresh (even if the MV refresh is a partial refresh), and, potentially to a lesser extent, during query execution using the MV data. The impact of compressing MV data on query execution cost can be reduced using techniques that allow query execution over compressed data without requiring decompression, such as utilizing known compression schemes that compute OR and 1-bit count operations directly on compressed data.

RANK-BASED BITMAPS TO COMPUTE COUNT(DISTINCT)

According to one or more embodiments, a database management system, such as DBMS 110, maintains rank-based bitmaps for computation of COUNT(DISTINCT) for a given target expression, i.e., where the bitmaps are generated based on ranks of target expression values within a given set of data. Using ranks to generate the bitmap data, before bucketizing the ranked value domain for the bitmap data, densifies the value domain. This densification limits MV row expansion described above for the discrete value bitmap technique, generally reduces the amount of storage required to store the bitmaps, and also limits the potential overhead required to handle the densified bitmaps.

Densification further eliminates the occurrence of bits, in the bitmap, that do not represent values that occur in a target expression. Furthermore, because the densified bitmap data is unlikely to be sparse, it may not be necessary to compress the bitmaps in order to reduce their sizes. Nevertheless, the relative density of the bitmaps in the bitmap data generally results in long run lengths, which compress well if compression is desired.

FIG. 2 depicts a flowchart 200 for using rank-based bitmaps to compute a COUNT(DISTINCT) function in a query, according to an embodiment. At step 202, a database management system maintains bitmap data that comprises one or more bitmaps, wherein, for each bitmap of the one or more bitmaps, each bit of the respective bitmap represents a respective rank that corresponds to a respective unique possible value of a particular expression from a particular set of data, where one or more hit ranks correspond to values, of the particular expression, that exist in the particular set of data, and where, within the bitmap data, one or more bits that correspond to hit ranks are set and the other bits, within the bitmap data, are unset.

For example, database management system 110 maintains, in database 132, a dense rank-based MV2 as follows. Specifically, MV2, as defined below, computes dense rank values of an expression by the (m) number of partition keys (key_1, . . . , key_m) that is a subset of the (p) number of grouping keys (key_1, . . . , key_p) such that (p>=n, and n>=m), where n is the number of grouping keys in COUNT (DISTINCT) queries that are targeted for rewrite.

```
CREATE MATERIALIZED VIEW MV2 AS
SELECT BITMAP_BUCKET_NUMBER(rank_expression) bktno,
  BITMAP_CONSTRUCT_AGG(BITMAP_BIT_POSITION
  (rank_expression)) as bitmap,
  key_1, . . . ,key_p
FROM
  (SELECT DENSE_RANK() OVER
  (PARTITION BY key_1,. . . , key_m ORDER BY expression) AS
    rank_expression
  FROM T
  )
GROUP BY key_1, . . . , key_p, BITMAP_BUCKET_NUMBER
(rank_expression);
```

In MV2, the values of a target expression ("expression") are ranked by the function DENSE_RANK to produce "rank_expression". This SQL function computes the rank of a given row in an ordered group of rows (i.e., from the target expression) and returns the rank as a NUMBER-type value. The ranks are consecutive integers beginning with 1. The largest rank value is the number of unique values returned by the target expression, e.g., computed within each partition formed by key_1, . . . , key_m. Rows with equal values for the ranking criteria receive the same rank. Because the ranked domain is comprised of discrete values, techniques described herein are applicable to any data type. (DENSE_RANK is described in further detail in Oracle Database Online Documentation, 10 g Release 2, Database SQL Reference, "DENSE_RANK", the entire contents of which is hereby incorporated by reference as if fully set forth herein.)

A query that computes the COUNT(DISTINCT) of a target expression that is grouped by n number of grouping keys may be rewritten to utilize an MV that maintains dense-ranked bitmaps for the target expression when a number (p) of grouping keys maintained by the MV is greater than or equal to n, i.e., the number of grouping keys in the query. In other words, an MV that is grouped by a (not strict) superset of the grouping keys of a query can be used to evaluate the query.

Furthermore, if the dense ranks in the bitmap data in an MV are calculated using partitions comprising an (m) number of grouping keys, the MV may be used to evaluate a query having an (n) number of grouping keys such that n>=m. In other words, an MV that utilizes a (not strict) subset of the grouping keys of a query as partition keys for the dense rank function may be utilized to evaluate the query. Specifically, when n>=m, the dense ranks assigned to the values within a given group in the MV can be rolled up to a grouping level that is required by the query.

According to an embodiment, when COUNT(DISTINCT) is computed on a base column of a database table, the rank of the base column is computed and materialized in the base table. According to another embodiment, which is illustrated in following examples, the ranks of target expression values are computed on-the-fly, i.e., either during query transformation, or, if the bitmaps are maintained in an MV, during MV creation and refresh.

The range length for rank_expression (i.e., the ranked value domain) never exceeds the range length of the target expression. In general, the range length for rank_expression is much smaller than the range length of the target expression. Accordingly, in general, the cardinality of MV2 is considerably smaller than the cardinality of MV1. Specifically, for each distinct set of values for key_1, . . . , key_p in the relation T, MV1 would have as many rows as there are bucket bitmaps based on the target expression. For MV1, as target expression values grow more sparsely scattered across the value domain, the number of bucket bitmaps is increased, and hence the cardinality of MV1 is increased to accommodate the increased distance between the minimum and maximum values of the target expression (i.e., the row expansion problem). In the case of an MV2 that maintains bitmaps for the same target expression and set of data as MV1, using the DENSE_RANK of the target expression values ensures that the sparsity of the target expression value domain does not affect the cardinality of MV2, i.e., because of the densified rank value domain. Thus, for sparse target expression value domains, MV2 requires a much smaller number of bucket bitmaps than MV1 when the same bucketizing criteria is used. Experiments on a customer workload showed more than 200× reduction in total space taken by rank-based MVs (over a subset of the grouping keys) than with the MVs constructed according to the discrete value bitmap technique.

Returning to the discussion of flowchart 200 (FIG. 2), at step 204, the database management system receives a query that requests a number of distinct values, of the particular expression, in the particular set of data. For example, DBMS 110 receives Q1, which requests the COUNT(DISTINCT) of a target expression from a data set defined by a sub-query T.

Steps 206 and 208 of flowchart 200 are performed in response to the database management system receiving the query. At step 206, the database management system rewrites the query to produce a rewritten query that is configured to compute the number of distinct values by counting bits, in the bitmap data, that are set. For example, database server instance 122 determines that MV2, stored in database 132, stores data for a COUNT(DISTINCT) function over the target expression in Q1. Thus, a rewrite module of database server instance 122 rewrites Q1 to generate the following rewritten query, "Q1R_1", which references the dense-rank based MV2:

```
(Q1R_1)
 SELECT SUM(agg)
 FROM
 ( SELECT BITMAP_COUNT(BITMAP_OR_AGG(bitmap)) as agg,
    key_1, . . . , key_n, bktno
   FROM MV2
   GROUP BY key_1,. . . ,key_n, bktno
 )
 GROUP BY key_1, . . . ,key_n.
```

At step 208 of flowchart 200, the database management system executes the rewritten query. For example, database server instance 122 executes Q1R_1 and returns the results set of Q1R_1 as results for Q1.

EXAMPLE DENSE RANK COMPUTATION

Figure 3:
FIG. 3 depicts an example table that a database management system maintains in a database.

FIG. 3 depicts an example table 300, "T1", that is maintained in database 132, where table 300 includes columns 302-310, and where ID column 302 uniquely identifies the rows in the table. In the simplified example of FIG. 3, table 300 includes only values corresponding to California in state column 306. However, table 300 may also include rows that correspond to one or more other states.

Database server instance 122 further maintains, in database 132, bitmap data that represents ranks for unique values in FIRST_NAME column 304 of table 300. According to one or more embodiments, this bitmap data is maintained in table 300, or in another table in database 132, such as in an MV. To illustrate, database management system 110 maintains, in database 132, an MV, "MV3", as follows:

```
{1} CREATE MATERIALIZED VIEW MV3 AS
{2} SELECT BITMAP_BUCKET_NUMBER(rank_expression) bktno,
{3}  BITMAP_CONSTRUCT_AGG(BITMAP_BIT_POSITION
     (rank_expression)) as bitmap,
{4}  T1.STATE, T1.COUNTY
{5} FROM
{6}  (SELECT DENSE_RANK() OVER (PARTITION BY T1.STATE
     ORDER BY T1.FIRST_NAME) AS
{7}    rank_expression
{8}  FROM T1
{9}  )
{10} GROUP BY T1.STATE, T1.COUNTY,
     BITMAP_BUCKET_NUMBER(rank_expression);
```

For each bitmap in MV3, each bit of the respective bitmap represents a respective rank that corresponds to a respective unique possible value of FIRST_NAME column 304 in table 300 ("T1"). According to an embodiment, as depicted in lines 6-7 of the definition of MV3, database server instance 122 determines the rank of each expression value within each T1.STATE value using the SQL function DENSE_RANK prior to bucketizing the bitmap data and grouping the bitmap data by T1.STATE and T1.COUNTY. Using MV3 to rewrite a query is described in further detail below.

BUCKET BITMAPS

According to an embodiment, the rank value domain, i.e., of rank_expression, in MV3 is bucketized. In this embodiment, bucketizing the bitmaps stored for a given grouping of data for a target expression reduces the sizes of the individual bitmaps, and, in some cases, allows for materialization of less than all bits corresponding to the range of ranks. Specifically, each of a plurality of bucket bitmaps, representing a given range of ranks, has the potential to represent only unset bits. A bucket bitmap that represents all unset bits need not be materialized to represent the unset bits.

Thus, in an embodiment, the bitmap data that represents the rank value domain of target expression for a given group is divided across multiple bucket bitmaps, each corresponding to a distinct sub-range of the ranks. For example, the ranks for values of a given target expression ranges from 0 to 999, and the bitmap data representing these ranks is partitioned into 10 smaller bucket bitmaps, each with a range of 100. To illustrate, a first bucket bitmap represents ranks from 0-99, a second bucket bitmap represents ranks from 100-199, a third bucket bitmap represents ranks from 200-299, and so on.

According to an embodiment, bucket bitmaps are selectively instantiated in order to save storage space. For instance, a bucket bitmap for a particular range is dynamically instantiated in response to determining that a rank, for a value in the target expression, exists in the range corresponding to the bucket bitmap. When determining a distinct count of values of the target expression for a given group, set bits from each of the bucket bitmaps stored for the group are summed, which produces the total number of distinct values in the group for the target expression.

Figure 4:
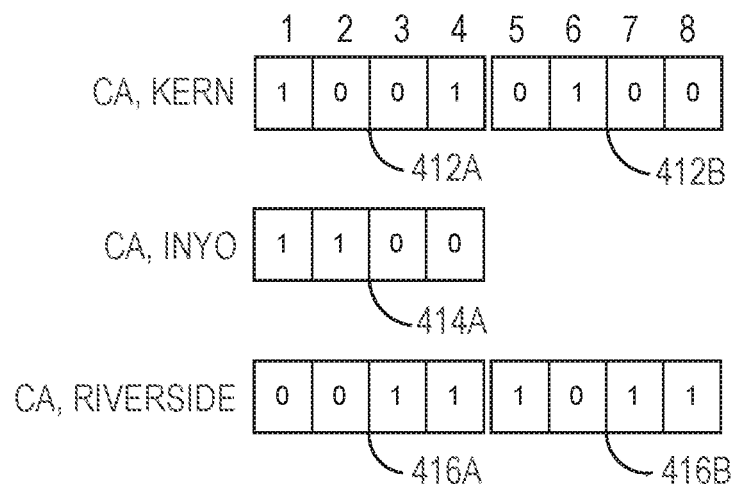
FIG. 4 depicts example implementations of a materialized view.

As depicted in lines 2-4 of the definition of MV3, the bitmap for a given group (i.e., grouped by T1.STATE, T1.COUNTY) is divided into buckets, which is determined by the function BITMAP_BUCKET_NUMBER, described in detail below. FIG. 4 depicts an example of MV3 based on table 300 (FIG. 3), i.e., MV 400, which is bucketized based on two bucket bitmaps per group. Specifically, in the example of MV 400, given a particular rank_expression, BITMAP_BUCKET_NUMBER returns either a 1 or a 2 to indicate the bucket bitmap to which the rank_expression corresponds. For example, the rank_expression for "Joe" from column 304 of table 300 is 1, which is represented in the $1^{st}$ bucket bitmap for the appropriate group (402A, 404A, or 406A). Note that, because there are no ranks in the $2^{nd}$ bucket bitmap for CA, Inyo (as described in further detail below), a second bucket bitmap is not instantiated for the group in MV 400.

PARTITION-BASED DENSE RANKS

According to an embodiment, ranks for target expression values (e.g., values in FIRST_NAME column 304 in table 300) are computed either on the entire input, or relative to a partition, i.e., that corresponds to a set of grouping keys. The PARTITION BY keys relative to which the ranks are computed (see, e.g., line 6 of the definition of MV3) represent a prefix of the grouping keys in the target query. Such partitions limit the sizes of the bitmaps to the number of distinct values in a subset of the entirety of data to which the data being represented by the bitmaps pertains, which is likely to be less than the number of distinct values in the entire dataset.

As described in further detail below, bitmaps may only be rolled up to the level of keys used for the rank partitions. Thus, the smaller the prefix of grouping keys used for the partitions, the more time it takes to create the MV, while the MV is applicable for a larger variety of queries. The larger the prefix, the more the overhead of computing the rank is reduced, while the applicability of the MV is more limited.

For example, as depicted in lines 6-7 of the definition of MV3, the ranks for T1.FIRST_NAME are determined based on data from table 300 partitioned by T1.STATE. According to the example of table 300, the data in FIRST_NAME column 304 includes eight distinct values for rows having "CA" in STATE column 306. Because DENSE_RANK is calculated for MV3 by state-based partitions, all values for T1.FIRST_NAME in a given state are assigned a distinct rank. Thus, in this example, any rows from table 300 that have a different value in STATE column 306 (not depicted in FIG. 3) would receive dense ranks with respect to data from the table with the same STATE column 306 value. In this way, the rank for the FIRST_NAME value of "Joe" with a STATE value of "CA" is independently assigned with respect to the rank assigned to the same first name with any other STATE value.

All of the rows depicted in table 300 have the value "CA" in the state column 306. As such, the dense ranks for values in FIRST_NAME column 304 depicted in table 300 are generated in connection with the same partition. To illustrate, the DENSE_RANK function from lines 6-7 of the definition of MV3 returns the following ranks: {Joe:1, Beth:2, Sam:3, Sarah:4, Brian:5, Isaiah:6, Charles:7, Ted:8}, as depicted in MV 400 (FIG. 4). Note that dense ranks are assigned according to the ordering of FIRST_NAME values because of the instruction, in MV3, to ORDER BY T1.FIRST_NAME As such, all instances of a particular FIRST_NAME value that are associated with a state value of "CA" are assigned the same rank by the DENSE_RANK function, and bitmaps created for various counties in California may be rolled up to the state level.

According to an embodiment, when the DENSE_RANK function in the MV definition is processed over partitions, database server instance 122 processes the dense ranks of two or more of the partitions in parallel, i.e., using parallel processing threads. Because of the independent nature of processing the DENSE_RANK function over respective partitions, no coordination between the parallel processes is required. Thus, processing the DENSE_RANK function in parallel improves the speed of generating a rank-based MV.

REWRITING AND EXECUTING AN EXAMPLE QUERY USING THE EXAMPLE MV

To further illustrate, database management system 110 receives the following query, "Q2":

```
(Q2)
SELECT COUNT(DISTINCT T1.FIRST_NAME)
FROM T1
GROUP BY T1.STATE, T1.COUNTY
```

Database server instance 122 determines that MV3, stored in database 132, maintains bitmap data for the target expression T1.FIRST_NAME, grouped by T1.STATE and T1.COUNTY, as in Q2. Thus, the rewrite module of database server instance 122 rewrites Q2 to generate a rewritten query, "Q2R", that references MV3 as follows:

```
(Q2R)
SELECT SUM(agg)
FROM
( SELECT BITMAP_COUNT(BITMAP_OR_AGG(bitmap)) as agg,
    T1.STATE, T1.COUNTY, bktno
  FROM MV3
  GROUP BY T1.STATE, T1.COUNTY, bktno
)
GROUP BY T1.STATE, T1.COUNTY.
```

Database server instance 122 executes Q2R, and returns the results of Q2R as the results of Q2. Specifically, as depicted in MV 400, the sum of the bits in the stored bitmap for CA, Kern is 3, the sum of the bits in the stored bitmap for CA, Inyo is 2, and the sum of the bits in the stored bitmap for CA, Riverside is 5. These values are returned as the respective COUNT(DISTINCT) results, for Q2, of the FIRST_NAME column 304 in table 300 for the indicated groups.

As a further example, database management system 110 receives the following query, "Q3":

```
(Q3)
SELECT COUNT(DISTINCT T1.FIRST_NAME)
FROM T1
GROUP BY T1.STATE
```

The rewrite module of database server instance 122 rewrites Q3 to generate a rewritten query, "Q3R", that references MV3 as follows:

```
(Q3R)
SELECT SUM(agg)
FROM
( SELECT BITMAP_COUNT(BITMAP_OR_AGG(bitmap)) as agg,
    T1.STATE, bktno
  FROM MV3
  GROUP BY T1.STATE, bktno
)
GROUP BY T1.STATE.
```

Database server instance 122 executes Q3R, and returns the results as the results set for Q3. Specifically, database server instance 122 rolls up the bitmaps stored in MV 400 for California, and sums the resulting rolled-up bitmap. Specifically, database server instance 122 ORs together all bucket bitmaps for CA that correspond to bucket number 1 (i.e., bucket bitmaps 402A, 404A, and 406A, resulting in a 4-bit bitmap with all bits set), and also ORs together all bucket bitmaps for CA that correspond to bucket number 2 (i.e., bucket bitmaps 402B and 406B, resulting in a 4-bit bitmap with all bits set). Accordingly, database server instance 122 returns that the COUNT(DISTINCT) of the FIRST_NAME column 304 in table 300 for CA is the sum of the two resulting rolled-up bitmaps, i.e., 8.

A MORE COMPLEX ILLUSTRATION OF BITMAP-BASED COUNT(DISTINCT) COMPUTATION

The following query, "Q4", is a more complex example query:

```
(Q4)
SELECT
  prods.prod_merch_|10_id,
  stores.store_mgmt_|10_id,
  dates.fis_week_id,
  SUM (facts.net_spend_amt) AS sum_net_spend_amt,
  COUNT (DISTINCT cards.hshd_id) AS count_distinct_households,
  COUNT(*) as count_star
FROM transaction_item_fct facts, prod_dim_c prods, store_dim_c stores,
  date_dim dates,
    card_dim_c cards
WHERE facts.prod_id = prods.prod_id
  AND facts.store_id = stores.store_id
  AND facts.date_id = dates.date_id
  AND facts.card_id = cards.card_id
  AND facts.date_id between date '2016-06-26' AND date '2016-07-26'
  GROUP BY prods.prod_merch_|10_id, stores.store_mgmt_|10_id,
  dates.fis_week_id;
```

Q4 has a five-table equi-join with one fact table, "transaction_item_fct" and four dimension tables, "prod_dim_c", "store_dim_c", "date_dim", and "card_dim_c". In Q4, a filter is applied so that the rows are limited to data associated with dates that are within a one month interval. The rows are grouped by three keys ("prod_merch_l10_id", "store_mgmt_l10_id", and "fis_week_id"), which are the group-by keys for the rest of this example. Q4 computes two non-distinct aggregates (SUM(facts.net_spend_amt), and COUNT(*)), and one COUNT(DISTINCT) aggregate on a numeric column "cards.hshd_id".

With the discrete value bitmap technique described in the Bitmap-Based Count Application, a user can create a materialized view, such as "fact_summary_mv_household2" defined below for storing bitmap data corresponding to the expression cards.hshd_id. The original expression is also used for determining the bucket numbers.

```
(Bitmap-based MV on original expression)
CREATE MATERIALIZED VIEW fact_summary_mv_household2 AS
SELECT prods.prod_merch_|10_id,
  stores.store_mgmt_|10_id,
  dates.fis_week_id,
  BITMAP BUCKET NUMBER (cards.hshd id) AS household bitmap
  bucket number,
  SUM (facts.net_spend_amt) AS sum_net_spend_amt,
  SUM (facts.item_qty) AS sum_item_qty,
  BITMAP CONSTRUCT AGG (BITMAP BIT POSITION
  (cards.hshd id)) AS
    household bitmap details,
  COUNT (*) AS count_star
FROM transaction_item_fct facts, prod_dim_c prods, store_dim_c stores,
date_dim dates, card_dim_c
  cards
WHERE facts.prod_id = prods.prod_id
  AND facts.store_id = stores.store_id
  AND facts.date_id = dates.date_id
  AND facts.card_id = cards.card_id
  AND facts.date_id BETWEEN DATE '2016-06-26' AND DATE
  '2016-07-26'
GROUP BY
prods.prod_merch_|10_id, stores.store_mgmt_|10_id, dates.fis_week_id,
  BITMAP BUCKET NUMBER (cards.hshd id)
```

In contrast, according to embodiments described herein, a user (or an MV advisor algorithm) creates an MV based on the ranks of the target expression of the COUNT(DISTINCT) function, i.e., cards.hshd_id, where the ranks are also used for determining the bucket numbers in the MV. According to an embodiment, the ranks are computed over the entire input, such as in the dense rank-based MV definition of "fact_summary_mv_household4_2" below.

```
(Bitmap-based MV on the DENSE_RANK of the entire input)
CREATE MATERIALIZED VIEW fact_summary_mv_household4_2 AS
SELECT prods.prod_merch_|10_id,
  stores.store_mgmt_|10_id,
  dates.fis_week_id,
  BITMAP BUCKET NUMBER (t.new hshd id) AS household bitmap
  bucket number,
  SUM (facts.net_spend_amt) AS sum_net_spend_amt,
  SUM (facts.item_qty) AS sum_item_qty,
  BITMAP CONSTRUCT AGG (BITMAP BIT POSITION (t.new hshd
  id))
  AS
    household bitmap details,
  COUNT (*) AS count_star
FROM
(
  SELECT prods.prod_merch_|10_id as prod_merch_|10_id,
    stores.store_mgmt_|10_id as store_mgmt_|10_id,
    dates.fis_week_id as fis_week_id,
    dense_rank() over (order by cards.hshd_id) AS new_hshd_id,
    facts.net_spend_amt AS net_spend_amt,
    facts.item_qty AS item_qty
  FROM transaction_item_fct facts, prod_dim_c prods, store_dim_c stores,
  date_dim dates,
    card_dim_c cards
  WHERE facts.prod_id = prods.prod_id
    AND facts.store_id = stores.store_id
    AND facts.date_id = dates.date_id
    AND facts.card_id = cards.card_id
    AND facts.date_id BETWEEN DATE '2016-06-26' AND DATE
    '2016-07-26'
) t
GROUP BY prods.prod_merch_|10_id, stores.store_mgmt_|10_id,
dates.fis_week_id,
  BITMAP BUCKET NUMBER (t.new hshd id)
```

According to another embodiment, an MV is created on the DENSE_RANK of the original expression, but relative to a prefix of the group-by keys rather than over the entire input. In this embodiment, the target expression values are first partitioned by this prefix, and the DENSE_RANK is only computed within each partition. In the following example MV definition of "fact_summary_mv_household_dense_rank_defsz", the DENSE_RANK is determined based on partitions over the entire set of group-by keys (which prevents rolling up the bitmaps for the various groups).

```
(Bitmap-based MV on the DENSE_RANK relative to all GROUP BY keys)
CREATE MATERIALIZED VIEW fact_summary_mv_household_dense_rank_defsz AS
SELECT prods.prod_merch_|10_id,
  stores.store_mgmt_|10_id,
  dates.fis_week_id,
  BITMAP BUCKET NUMBER (t.new hshd id) AS household bitmap bucket number,
  SUM (facts.net_spend_amt) AS sum_net_spend_amt,
  SUM (facts.item_qty) AS sum_item_qty,
  BITMAP CONSTRUCT AGG (BITMAP BIT POSITION (t.new hshd id)) AS
    household bitmap details,
  COUNT (*) AS count_star
FROM
(
  SELECT prods.prod_merch_|10_id as prod_merch_|10_id,
    stores.store_mgmt_|10_id as store_mgmt_|10_id,
    dates.fis_week_id as fis_week_id,
    dense_rank() over
      (partition by prods.prod_merch_|10_id,
        stores.store_mgmt_|10_id,
        dates.fis_week_id
      order by cards.hshd_id) as new_hshd_id,
```

```
   facts.net_spend_amt AS net_spend_amt,
   facts.item_qty AS item_qty
 FROM transaction_item_fct facts, prod_dim_c prods, store_dim_c stores, date_dim dates,
     card_dim_c cards
 WHERE facts.prod_id = prods.prod_id
   AND facts.store_id = stores.store_id
   AND facts.date_id = dates.date_id
   AND facts.card_id = cards.card_id
   AND facts.date_id BETWEEN DATE '2016-06-26' AND DATE '2016-07-26'
) t
GROUP BY prods.prod_merch_|10_id, stores.store_mgmt_|10_id, dates.fis_week_id,
   BITMAP BUCKET NUMBER (t.new hshd id)
```

In the following example MV definition of "fact_summary_mv_household_dense_rank_defsz_rollup", the DENSE_RANK is determined based on partitions over the first 2 group-by keys (which allows for rolling up the bitmaps for the various groups up to the partition level).

```
Bitmap-based MV on the DENSE_RANK relative to a prefix (first 2 of 3 keys) of the GROUP BY keys
CREATE MATERIALIZED VIEW fact_summary_mv_household_dense_rank_defsz_rollup AS
SELECT prods.prod_merch_|10_id,
   stores.store_mgmt_|10_id,
   dates.fis_week_id,
   BITMAP BUCKET NUMBER (t.new hshd id) AS household bitmap bucket number,
   SUM (facts.net_spend_amt) AS sum_net_spend_amt,
   SUM (facts.item_qty) AS sum_item_qty,
   BITMAP CONSTRUCT AGG (BITMAP BIT POSITION (t.new hshd id)) AS
      household bitmap details,
   COUNT (*) AS count_star
FROM
(
 SELECT prods.prod_merch_|10_id as prod_merch_|10_id,
     stores.store_mgmt_|10_id as store_mgmt_|10_id,
     dates.fis_week_id as fis_week_id,
     dense_rank() over
      (partition by prods.prod_merch_|10_id,
         stores.store_mgmt_|10_id,
      order by cards.hshd_id) as new_hshd_id,
     facts.net_spend_amt AS net_spend_amt,
     facts.item_qty AS item_qty
 FROM transaction_item_fct facts, prod_dim_c prods, store_dim_c stores, date_dim dates,
     card_dim_c cards
 WHERE facts.prod_id = prods.prod_id
   AND facts.store_id = stores.store_id
   AND facts.date_id = dates.date_id
   AND facts.card_id = cards.card_id
   AND facts.date_id BETWEEN DATE '2016-06-26' AND DATE '2016-07-26'
) t
GROUP BY prods.prod_merch_|10_id, stores.store_mgmt_|10_id, dates.fis_week_id,
   BITMAP BUCKET NUMBER (t.new hshd id)
```

The following rewritten query, "Q4R", below is rewritten using the last of these MVs, i.e., fact_summary_mv_household_dense_rank_defsz_rollup. The same MV can be used for rewriting a query that is similar to Q4, but that, instead, groups on prods.prod_merch_l10_id and stores.store_mgmt_l10_id only. By contrast, such a query variant would not be able to make use of fact_summary_mv_household_dense_rank_defsz.

```
(Q4R)
 SELECT prod_merch_|10_id,
     store_mgmt_|10_id,
     fis_week_id,
     sum(agg_1) as sum_net_spend_amt,
     sum(agg_2) as count_distinct_households,
     sum(agg_3) as count_star
   FROM
     (SELECT prod_merch_|10_id,
        store_mgmt_|10_id,
        fis_week_id,
        SUM (sum_net_spend_amt) AS agg_1,
        bitmap_count(bitmap_or_agg(household_bitmap_details)) as agg_2,
        SUM(count_star) as agg_3
     FROM fact_summary_mv_household_dense_rank_defsz_rollup
     GROUP BY prod_merch_|10_id,
        store_mgmt_|10_id,
        fis_week_id,
        household_bitmap_bucket_number
     ) -- this group is not necessary actually but we leave it here in case the
MV
   is changed to add extra grouping columns (which would need to be car-
ried
     over in a partition by clause for dense rank)
```

```
GROUP BY prod_merch_|10_id,
  store_mgmt_|10_id,
  fis_week_id
```

PERFORMANCE RESULTS

To give an intuition of the effects of using the rank-based techniques described herein, the following table lists performance results:

| MV | MV creation time relative to MV on DENSE_RANK over entire input | MV cardinality | MV size on disk relative | Query elapsed time improvement ratio | MV applicability/rollup grade (higher is better) |
|---|---|---|---|---|---|
| original | 0.08 | 762M | 288 GB | 1 | 4 |
| DENSE_RANK over entire input | 1.00 | 150M | 22 GB | 4.9 | 4 |
| DENSE_RANK relative to smallest prefix (1) GROUP BY keys in target query | 0.13 | 633K | 5.6 GB | 5.5 | 3 |
| DENSE_RANK relative to a prefix (2) GROUP BY keys in target query | 0.06 | 606K | 0.32 GB | 28.3 | 2 |
| DENSE_RANK relative to all (3) GROUP BY keys in target query | 0.10 | 380K | 0.08 GB | 25.1 | 1 |

As shown in the table above, there is a tradeoff between the amount of time it takes to create an MV and the usability of the MV, especially with regard to flexibility of roll-up levels.

In the experiment that produced the above statistics, focusing on performance of the rewritten query, the original method was not showing an improvement because the large size of the MV was causing the query to spill to disk. The best query improvement, as well as the smallest running time for MV creation, are given by using the MV with DENSE_RANK based on input partitioned by the first two of the grouping keys. However, this MV can be used only for the target query and its rolled-up version to these two grouping keys, which is the reason that this version of the MV has a grade of 2 for applicability. If an MV is needed that can be used for a target query and all its rolled-up versions (roll-up grade 4), then the rank-MV with non-partitioned input may be used. However, in this case, MV creation time is increased relative to an MV that ranks partitioned target expression values.

MV REFRESH

Computing the target expression value ranks relative to partitions allows techniques of partition-wise change tracking to be applied for partial MV refresh. Specifically, according to the discrete value bitmap technique described in the Bitmap-Based Count Application, MVs can be partially refreshed during INSERTs or bulk loads; bitmaps for added rows can be OR-ed together with existing bitmaps for matching bucket bitmaps. This is not possible for MVs computed based on DENSE_RANK of the expression on the entire input, i.e., in the absence of PARTITION BY specification. However, for MVs computed based on DENSE_RANK over input partitioned by a number of keys, techniques similar to logical partition change tracking can be used, including one or more of:

Rows deleted or added are marked with the logical partition based on the PARTITION BY specification.

Only bitmaps for the tracked partitions with data change are recomputed because the ranks are only potentially changed in those partitions.

For the changed partitions, the target expression value ranks are recomputed across the entire partitions, respectively; that is, even if only INSERTs or bulk loads have occurred in a given changed partition, the target expression value ranks are recomputed, as are the corresponding bitmaps across all rows in the changed partition (including existing rows and delta rows).

In some instances, grouping criteria selected for the target expression value rank partitions may be selected to reduce the recomputation burden for MV refresh. For example, it would be beneficial to include a DATE column as part of the PARTITION BY keys for an MV. Thus, if bulk loads are added by DATE, bulk loads will always add a new partition for the MV, and there is no need to re-compute target expression value ranks for base rows.

DEFINED SQL FUNCTIONS

According to one or more embodiments, DBMS 110 implements one or more new SQL functions for constructing bitmaps and bucket bitmaps, populating the bucket bitmaps, and merging the bucket bitmaps, etc., as described in further detail below.

THE BITMAP_CONSTRUCT_AGG FUNCTION

In an embodiment, DBMS 110 implements a BITMAP_CONSTRUCT_AGG function that, when called, generates a bitmap if the bitmap does not already exist, where the new bitmap has bitmap positions that correspond to all possible values for a given expression. The input for the BITMAP_CONSTRUCT_AGG function are ranks calculated for values of the target expression. According to an embodiment, BITMAP_CONSTRUCT_AGG returns NULL if there are no inputs. In this way, the BITMAP_CONSTRUCT_AGG function results in materialization of bitmaps as needed.

The function receives the target expression value ranks and sets the bit positions corresponding to the values for the given expression to 1 within the bitmap data. The output is the bitmap representation of the target expression value ranks where bitmap positions corresponding to the target expression value ranks of values in the set of data are set to 1. For example, if an expression V maps to possible values 0-9 and the input values include the set of [0,1,2,3], then the output of the BITMAP_CONSTRUCT_AGG is a bitmap representations for the ranks of the possible values of expression V where bits corresponding to ranks for the existing values, mapping to positions [0,1,2,3], are set and the remaining positions are unset.

THE BITMAP_BUCKET_NUMBER FUNCTION

In an embodiment, DBMS 110 implements a BITMAP_BUCKET_NUMBER function that, when called, determines a particular bucket bitmap, of the bucket bitmaps, that contains a bit position corresponding to a particular target expression value rank. Inputs for BITMAP_BUCKET_NUMBER function include the rank_expression to be evaluated and a size in bits of the ranges for the bucket bitmaps, where the size parameter is an optional input parameter. For example, the BITMAP_BUCKET_NUMBER function may receive (a) a rank calculated for an expression V for a particular tuple and (b) the size of the range of bucket bitmaps, which, e.g., indicates that each bucket bitmap has a range of 100 bits. In this example, the BITMAP_BUCKET_NUMBER function determines, based on an input rank of 101, that the indicated rank maps to the second bucket bitmap, where the second bucket bitmap range is 100-199, based on each bucket having ranges of 100 bits each.

THE BITMAP_BIT_POSITION FUNCTION

In an embodiment, DBMS 110 implements a BITMAP_BIT_POSITION function that, when called, determines a bit position relative to a provided bucket bitmap range. The BITMAP_BIT_POSITION function receives, as input, the target expression value rank to be evaluated and a size, in bits, of the ranges of the bucket bitmaps, where the size of ranges input is an optional input parameter. The output of the BITMAP_BIT_POSITION function is the bit position corresponding to the input ranks, relative to the bucket bitmap range. Using the previous example, where the bit positions of each bucket bitmap range from 0-99 (i.e., 100 bit positions) and the input target expression value rank is 101, the BITMAP_BIT_POSITION function outputs the bit position 1 (i.e., in the second bucket with a range of 100-199).

THE BITMAP_OR_AGG FUNCTION

In an embodiment, DBMS 110 implements a BITMAP_OR_AGG function (an aggregate function) that, when called, merges a set of bucket bitmaps by performing OR operations on each corresponding bit within each of the set of bucket bitmaps. The BITMAP_OR_AGG function receives, as input, the set of bucket bitmaps to be merged. The output of the BITMAP_OR_AGG function is a single merged bucket bitmap. For example, the BITMAP_OR_AGG function receives, as input, bucket bitmaps 412A ([1, 0, 0, 1]), 414A ([1, 1, 0, 0]), and 416A ([0, 0, 1, 0]), and outputs a merged bucket bitmap ([1, 1, 1, 1]).

THE BITMAP_COUNT FUNCTION

In an embodiment, DBMS 110 implements a BITMAP_COUNT function that is a scalar function that receives, as input, a bitmap and returns, as output, a count of the set bits in the input bitmap.

INPUT VALIDITY CHECKS

For the discrete value bitmap technique, in the absence of enabled constraints that guarantee the target expression values are discrete, or if the SQL data type of the target expression does not guarantee discrete values, every row is verified to determine whether the value is, indeed, discrete. The MV creation statement is failed and an error is raised the first time a target expression value is found that is not discrete. However, when rank-based bitmap data is used, such checks are not required, and, according to an embodiment one or both of the BITMAP_BUCKET_NUMBER and BITMAP_BIT_POSITION functions described above can be optimized to skip such checks.

NETWORK ARRANGEMENT ARCHITECTURE

FIG. 1 is a block diagram that depicts an example network arrangement 100 for DBMS 110, according to one or more embodiments. Network arrangement 100 includes a client device 140 and a database server computing device 120 communicatively coupled via a network 150. Network 150 may be implemented with any type of medium and/or mechanism that facilitates the exchange of information between client device 140 and server device 120. Example network arrangement 100 may include other devices, including client devices, server devices, storage devices, and display devices, according to one or more embodiments.

Client device 140 may be implemented by any type of computing device that is communicatively connected to network 150. In network arrangement 100, client device 140 is configured with a database client 142, which may be implemented in any number of ways, including as a stand-alone application running on client device 140, or as a plugin to a browser running at client device 140, etc. Client device 140 may be configured with other mechanisms, processes and functionalities, depending upon a particular implementation.

In network arrangement 100, server device 120 is configured with a database server instance 122. Server device 120 is implemented by any type of computing device that is capable of communicating with client device 140 over network 150 and also capable of running database server instance 122. Server device 120 may be configured with other mechanisms, processes and functionalities, depending upon a particular implementation.

Database server instance 122 on server device 120 maintains access to and manages data in database 132 (i.e., on storage 130). According to one or more embodiments, access to a given database comprises access to (a) a set of disk drives storing data for the database, and (b) data blocks stored thereon. Database 132 may reside in any type of storage 130, including volatile and non-volatile storage, e.g., random access memory (RAM), one or more hard disks, main memory, etc.

Any of the functionality attributed to database client 142, database server instance 122, or DBMS 110 herein may be performed by any other entity, which may or may not be depicted in network arrangement 100, according to one or more embodiments. One or more of the functions attributed to any process described herein, according to one or more embodiments, may be performed any other logical or physical entity, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

DATABASE OVERVIEW

Embodiments of the present invention are used in the context of database management systems (DBMSs), such as DBMS 110. Therefore, a description of an example DBMS is provided.

Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database comprises data and a database dictionary that is stored on a persistent memory mechanism, such as a set of hard disks. A database is defined by its own separate database dictionary. A database dictionary comprises metadata that defines database objects contained in a database. In effect, a database dictionary defines the totality of a database. Database objects include tables, table columns, and tablespaces. A tablespace is a set of one or more files that are used to store the data for various types of database objects, such as a table. If data for a database object is stored in a tablespace, a database dictionary maps a database object to one or more tablespaces that hold the data for the database object.

A database dictionary is referred to by a DBMS to determine how to execute database commands submitted to a DBMS. Database commands can access the database objects that are defined by the dictionary.

A database command may be in the form of a database statement. For the database server to process the database statements, the database statements must conform to a database language supported by the database server. One non-limiting example of a database language that is supported by many database servers is SQL, including proprietary forms of SQL supported by such database servers as Oracle, (e.g. Oracle Database 11 g). SQL data definition language ("DDL") instructions are issued to a database server to create or configure database objects, such as tables, views, or complex types. Data manipulation language ("DML") instructions are issued to a DBMS to manage data stored within a database structure. For instance, SELECT, INSERT, UPDATE, and DELETE are common examples of DML instructions found in some SQL implementations. SQL/XML is a common extension of SQL used when manipulating XML data in an object-relational database.

A single-node database system, such as DBMS 110 as depicted in FIG. 1, comprises a single node that runs a database server instance that accesses and manages the database. According to an embodiment, DBMS 110 is implemented as a multi-node database management system, which is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

QUERY PROCESSING

A query is an expression, command, or set of commands that, when executed, causes a server to perform one or more operations on a set of data. A query may specify source data object(s), such as table(s), column(s), view(s), or snapshot (s), from which result set(s) are to be determined. For example, the source data object(s) may appear in a FROM clause of a Structured Query Language ("SQL") query. SQL is a well-known example language for querying database objects. As used herein, the term "query" is used to refer to any form of representing a query, including a query in the form of a database statement and any data structure used for internal query representation. The term "table" refers to any source object that is referenced or defined by a query and that represents a set of rows, such as a database table, view, or an inline query block, such as an inline view or subquery.

The query may perform operations on data from the source data object(s) on a row by-row basis as the object(s) are loaded or on the entire source data object(s) after the object(s) have been loaded. A result set generated by some operation(s) may be made available to other operation(s), and, in this manner, the result set may be filtered out or narrowed based on some criteria, and/or joined or combined with other result set(s) and/or other source data object(s).

Generally, a query parser receives a query statement and generates an internal query representation of the query statement. Typically, the internal query representation is a set of interlinked data structures that represent various components and structures of a query statement.

The internal query representation may be in the form of a graph of nodes, each interlinked data structure corresponding to a node and to a component of the represented query statement. The internal representation is typically generated in memory for evaluation, manipulation, and transformation.

QUERY OPTIMIZATION

As used herein, a query is considered "rewritten" when the query is (a) rewritten from a first expression or representation to a second expression or representation, (b) received in a manner that specifies or indicates a first set of operations, such as a first expression, representation, or execution plan, and executed using a second set of operations, such as the operations specified by or indicated by a second expression, representation, or execution plan, or (c) received in a manner that specifies or indicates a first set of operations, and planned for execution using a second set of operations.

Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by that query or execution plan, if executed.

A query optimizer may optimize a query by rewriting the query. In general, the query optimizer rewrites a query into another query that produces the same result and that can potentially be executed more efficiently, i.e., one for which a potentially more efficient and/or less costly execution plan can be generated. A query may be rewritten by manipulating any internal representation of the query, including any copy thereof, to form a rewritten query or a rewritten query representation. Alternatively, and/or in addition, a query may be rewritten by generating a different but semantically equivalent database statement. According to embodiments, the query optimizer of primary database system 110 determines to offload a query to standby database system 140 based on determining that an execution plan involving offloading the query is estimated to be more efficient than an alternative execution plan that does not involve offloading the query to system 140, but runs the query over database 132.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
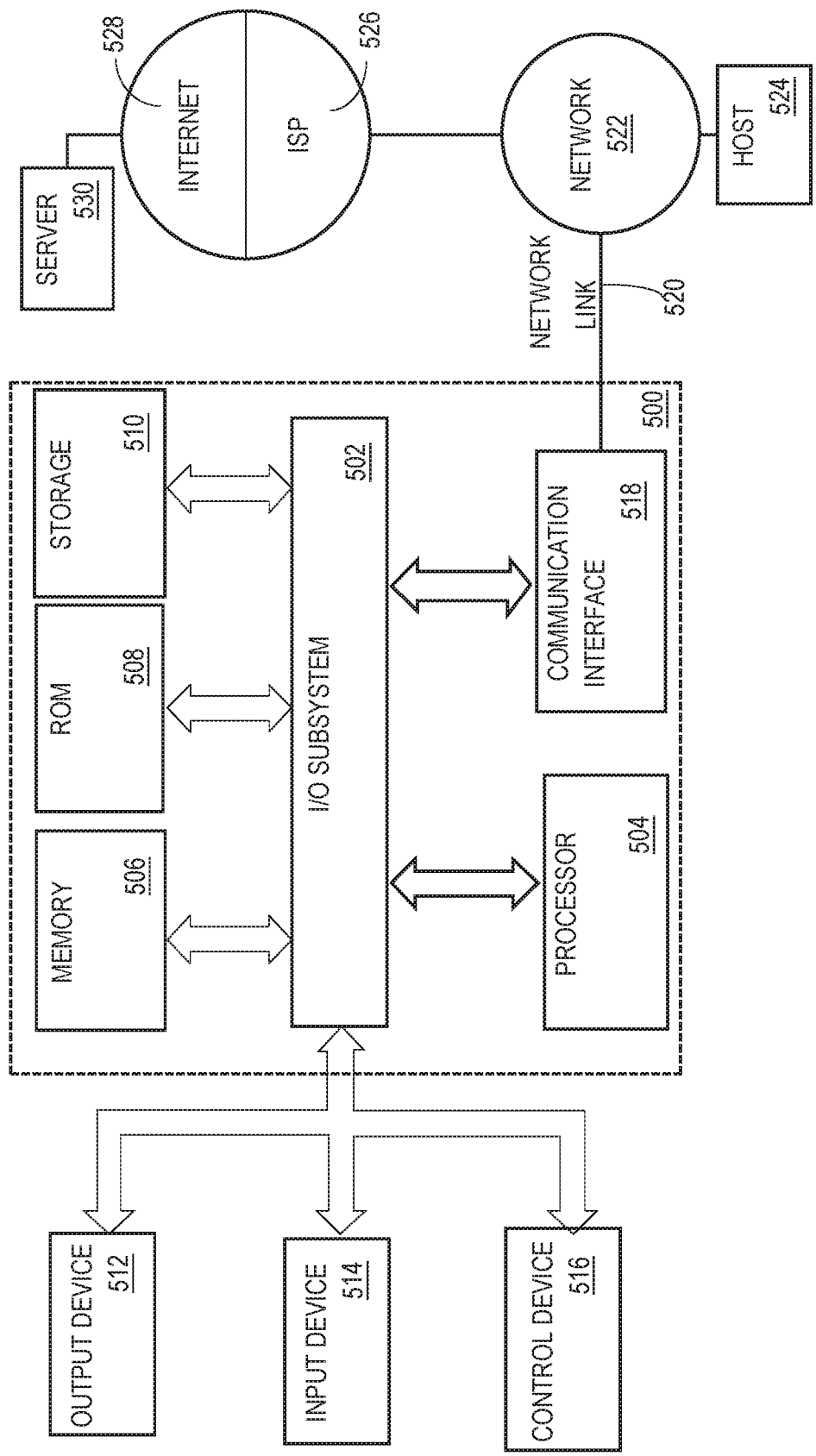
FIG. 5 is a block diagram of a computer system on which embodiments may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile median includes, for example, optical disks, magnetic disks, or solid-state drives, such as storage device 510. Volatile median includes dynamic memory, such as main memory 506. Common forms of storage median include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission median includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

SOFTWARE OVERVIEW

Figure 6:
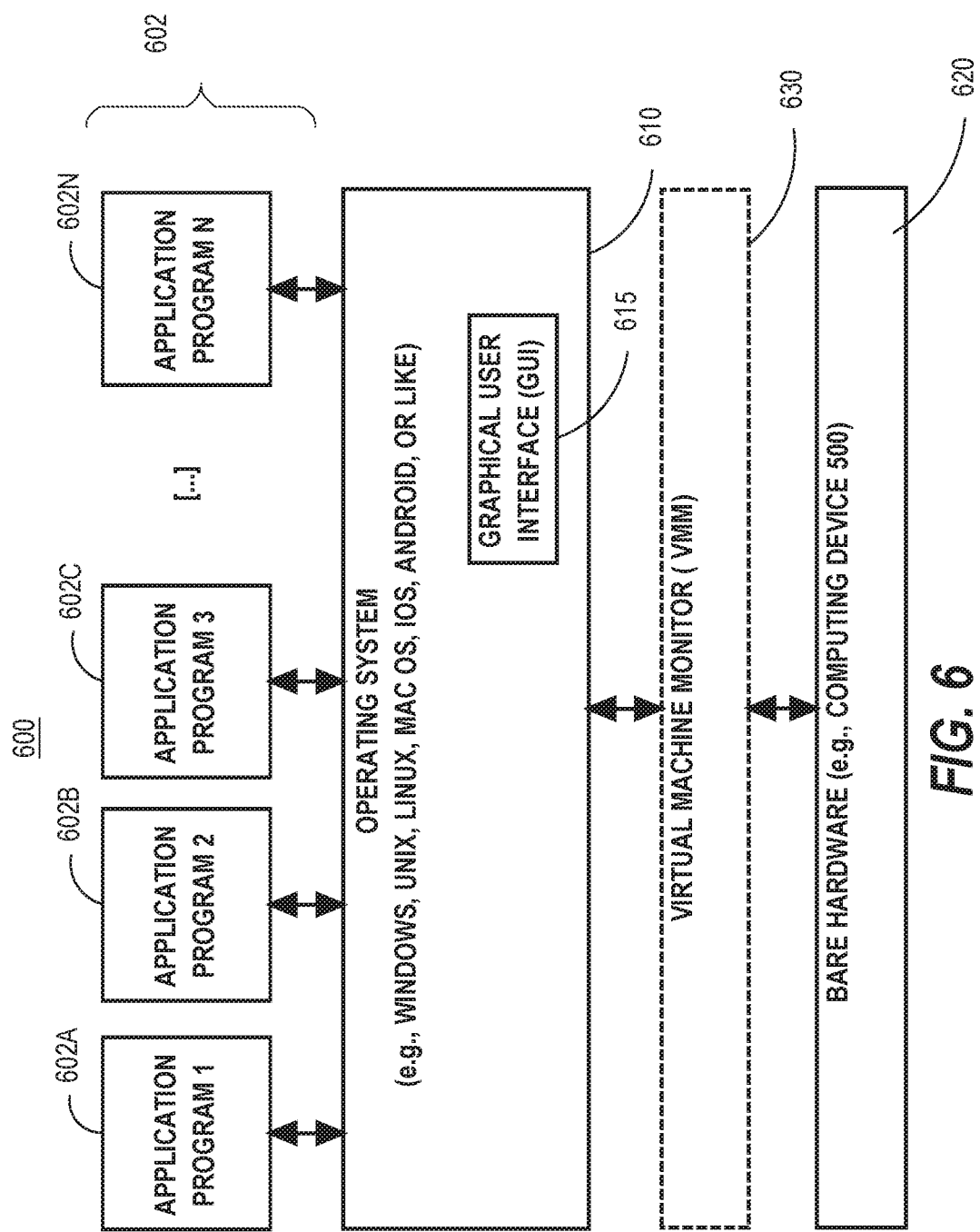
FIG. 6 depicts a software system that may be used in an embodiment.

FIG. 6 is a block diagram of a basic software system 600 that may be employed for controlling the operation of computer system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computer system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 500 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   a database management system maintaining bitmap data that represents a bitmap, wherein each bit of the bitmap represents a unique value of a particular expression that exists in a particular set of data;
   wherein the bitmap data comprises a plurality of sets of bits representing at least a particular portion of the bitmap;
   wherein each set of bits of the plurality of sets of bits:
      corresponds to a corresponding grouping key value, of a particular grouping key, that exists in the particular set of data, and
      comprises one or more bits, having a particular bit value, that correspond to one or more values, of the particular expression, that exist in the particular set of data in association with the corresponding grouping key value;
   the database management system receiving a query that requests a number of distinct values, of the particular expression, in the particular set of data; and
   in response to receiving the query:
      the database management system rewriting the query to produce a rewritten query that is configured to compute the number of distinct values by counting bits, in the bitmap data, that are set to the particular bit value, and
      the database management system executing the rewritten query.

2. The computer-executed method of claim 1, wherein:
   each unique value of the particular expression that exists in the particular set of data corresponds to a unique value identifier based on which said each unique value is mapped to a representative bit in the bitmap;
   the unique value identifiers represent a range of consecutive integers;
   the bitmap data comprises, one or more bitmaps, each of which represents an associated partition of the range of unique value identifiers.

3. The computer-executed method of claim 2, further comprising, for each unique value identifier corresponding to a unique value of the particular expression that exists in the particular set of data:
   determining whether a bit corresponding to said each unique value identifier is represented within a range of unique value identifiers represented by an instantiated bitmap of the one or more bitmaps;
   in response to determining that a bit corresponding to said each unique value identifier is not represented with a range of unique value identifiers represented by any instantiated bitmap of the one or more bitmaps:
      instantiating a new bitmap that represents a range of unique value identifiers that includes said each unique value identifier,
      determining a bit index, corresponding to said each unique value identifier, within the new bitmap, and
      setting a bit, at the determined bit index in the new bitmap, to the particular bit value.

4. The computer-executed method of claim 3, further comprising the database management system compressing one or more particular bitmaps, of the one or more bitmaps, to produce one or more compressed bitmaps.

5. The computer-executed method of claim 1, wherein the database management system maintains the bitmap data in a materialized view.

6. The computer-executed method of claim 1, further comprising:

the database management system receiving information regarding a plurality of grouping keys, comprising the particular grouping key, for the bitmap data;

wherein the database management system maintaining the bitmap data further comprises maintaining at least one set of bits, of the plurality of sets of bits, for each group, of a plurality of groups that are representable by the plurality of grouping keys, based on the particular set of data.

7. The computer-executed method of claim 6, wherein:

the plurality of grouping keys comprises (a) a first-level grouping key, and (b) a second-level grouping key that is subsidiary to the first-level grouping key;

the plurality of groups is grouped by at least both the first-level grouping key and the second-level grouping key;

the number of distinct values requested by the query is the number of distinct values, of the particular expression in the particular set of data, for one or more first-level groups that are grouped by the first-level grouping key;

the rewritten query is further configured to OR together sets of bits, for two or more groups, of the plurality of groups, that correspond to the first-level grouping key, to produce one or more combination bitmaps; and the rewritten query is further configured to compute the number of distinct values based, at least in part, on the one or more combination bitmaps.

8. The computer-executed method of claim 6, wherein:

the number of distinct values requested by the query is the number of distinct values, of the particular expression in the particular set of data, for data that is not grouped using the particular grouping key;

the rewritten query is further configured to OR together bitmaps, for two or more groups, of the plurality of groups, that correspond to the particular grouping key, to produce one or more aggregate bitmaps; and the rewritten query is further configured to compute the number of distinct values based, at least in part, on the one or more aggregate bitmaps.

9. The computer-executed method of claim 1, wherein:

each unique value of the particular expression that exists in the particular set of data corresponds to a unique value identifier based on which said each unique value is mapped to a representative bit in the bitmap; and the method further comprises the database management system using a DENSE_RANK function to determine unique value identifiers for respective unique values of the particular expression that exist within the particular set of data.

10. The computer-executed method of claim 1, wherein:

each unique value of the particular expression that exists in the particular set of data corresponds to a unique value identifier based on which said each unique value is mapped to a representative bit in the bitmap; and the method further comprises the database management system determining unique value identifiers that correspond to respective unique values of the particular expression that exist within the particular set of data relative to partitions, of the particular set of data, that are based on particular grouping criteria.

11. The computer-executed method of claim 10, further comprising:

the database management system receiving information regarding two or more grouping keys for the bitmap data that include the particular grouping key;

wherein the two or more grouping keys comprise at least (a) a first-level grouping key, and (b) a second-level grouping key that is subsidiary to the first-level grouping key;

wherein the particular grouping criteria is based, at least in part, on the first-level grouping key.

12. The computer-executed method of claim 11, wherein the two or more grouping keys group data for one of: a materialized view in which the bitmap data is maintained; or the query.

13. The computer-executed method of claim 1, wherein value types of the particular expression from the particular set of data comprise at least one of:

integer-type number values;
non-integer-type number values;
fixed-length character-type values;
variable-length character-type values;
date-type values; or
timestamp-type values.

14. One or more non-transitory computer-readable media storing one or more sequences of instructions that, when executed by one or more processors, cause:

a database management system maintaining bitmap data that represents a bitmap, wherein each bit of the bitmap represents a unique value of a particular expression that exists in a particular set of data;

wherein the bitmap data comprises a plurality of sets of bits representing at least a particular portion of the bitmap;

wherein each set of bits of the plurality of sets of bits:

corresponds to a corresponding grouping key value, of a particular grouping key, that exists in the particular set of data, and comprises one or more bits, having a particular bit value, that correspond to one or more values, of the particular expression, that exist in the particular set of data in association with the corresponding grouping key value;

the database management system receiving a query that requests a number of distinct values, of the particular expression, in the particular set of data; and in response to receiving the query:

the database management system rewriting the query to produce a rewritten query that is configured to compute the number of distinct values by counting bits, in the bitmap data, that are set to the particular bit value, and the database management system executing the rewritten query.

15. The one or more non-transitory computer-readable media of claim 14, wherein:

each unique value of the particular expression that exists in the particular set of data corresponds to a unique value identifier based on which said each unique value is mapped to a representative bit in the bitmap;

the unique value identifiers represent a range of consecutive integers;

the bitmap data comprises, one or more bitmaps, each of which represents an associated partition of the range of unique value identifiers.

16. The one or more non-transitory computer-readable media of claim 15, wherein the one or more sequences of instructions further comprise instructions that, when executed by one or more processors, cause, for each unique value identifier corresponding to a unique value of the particular expression that exists in the particular set of data:

determining whether a bit corresponding to said each unique value identifier is represented within a range of unique value identifiers represented by an instantiated bitmap of the one or more bitmaps;

in response to determining that a bit corresponding to said each unique value identifier is not represented with a range of unique value identifiers represented by any instantiated bitmap of the one or more bitmaps:

instantiating a new bitmap that represents a range of unique value identifiers that includes said each unique value identifier, determining a bit index, corresponding to said each unique value identifier, within the new bitmap, and setting a bit, at the determined bit index in the new bitmap, to the particular bit value.

17. The one or more non-transitory computer-readable media of claim 16, wherein the one or more sequences of instructions further comprise instructions that, when executed by one or more processors, cause the database management system compressing one or more particular bitmaps, of the one or more bitmaps, to produce one or more compressed bitmaps.

18. The one or more non-transitory computer-readable media of claim 14, wherein the database management system maintains the bitmap data in a materialized view.

19. The one or more non-transitory computer-readable media of claim 14, wherein the one or more sequences of instructions further comprise instructions that, when executed by one or more processors, cause:

the database management system receiving information regarding one or more a plurality of grouping keys, comprising the particular grouping key, for the bitmap data;

wherein the database management system maintaining the bitmap data further comprises maintaining at least one set of bits bitmap, of the plurality of sets of bits, for each group, of a plurality of groups that are representable by the plurality of grouping keys, based on the particular set of data.

20. The one or more non-transitory computer-readable media of claim 19, wherein:

the plurality of grouping keys comprises (a) a first-level grouping key, and (b) a second-level grouping key that is subsidiary to the first-level grouping key;

the plurality of groups is grouped by at least both the first-level grouping key and the second-level grouping key;

the number of distinct values requested by the query is the number of distinct values, of the particular expression in the particular set of data, for one or more first-level groups that are grouped by the first-level grouping key;

the rewritten query is further configured to OR together sets of bits, for two or more groups, of the plurality of groups, that correspond to the first-level grouping key, to produce one or more combination bitmaps; and the rewritten query is further configured to compute the number of distinct values based, at least in part, on the one or more combination bitmaps.

21. The one or more non-transitory computer-readable media of claim 19, wherein:

the number of distinct values requested by the query is the number of distinct values, of the particular expression in the particular set of data, for data that is not grouped using the particular grouping key;

the rewritten query is further configured to OR together bitmaps, for two or more groups, of the plurality of groups, that correspond to the particular grouping key, to produce one or more aggregate bitmaps; and the rewritten query is further configured to compute the number of distinct values based, at least in part, on the one or more aggregate bitmaps.

22. The one or more non-transitory computer-readable media of claim 14, wherein:

each unique value of the particular expression that exists in the particular set of data corresponds to a unique value identifier based on which said each unique value is mapped to a representative bit in the bitmap; and the one or more sequences of instructions further comprise instructions that, when executed by one or more processors, cause the database management system using a DENSE_RANK function to determine unique value identifiers for respective unique values of the particular expression that exist within the particular set of data.

23. The one or more non-transitory computer-readable media of claim 14, wherein:

each unique value of the particular expression that exists in the particular set of data corresponds to a unique value identifier based on which said each unique value is mapped to a representative bit in the bitmap; and the one or more sequences of instructions further comprise instructions that, when executed by one or more processors, cause the database management system determining unique value identifiers that correspond to respective unique values of the particular expression that exist within the particular set of data relative to partitions, of the particular set of data, that are based on particular grouping criteria.

24. The one or more non-transitory computer-readable media of claim 23, wherein the one or more sequences of instructions further comprise instructions that, when executed by one or more processors, cause:

the database management system receiving information regarding two or more grouping keys for the bitmap data that include the particular grouping key;

wherein the two or more grouping keys comprise at least (a) a first-level grouping key, and (b) a second-level grouping key that is subsidiary to the first-level grouping key;

wherein the particular grouping criteria is based, at least in part, on the first-level grouping key.

25. The one or more non-transitory computer-readable media of claim 24, wherein the two or more grouping keys group data for one of: a materialized view in which the bitmap data is maintained; or the query.

26. The one or more non-transitory computer-readable media of claim 14, wherein value types of the particular expression from the particular set of data comprise at least one of:

integer-type number values;
non-integer-type number values;
fixed-length character-type values;
variable-length character-type values;
date-type values; or
timestamp-type values.

* * * * *

UNITED STATES PATENT AND TRADEMARK OFFICE
CERTIFICATE OF CORRECTION

PATENT NO. : 11,429,606 B2
APPLICATION NO. : 16/726597
DATED : August 30, 2022
INVENTOR(S) : Petride et al.

It is certified that error appears in the above-identified patent and that said Letters Patent is hereby corrected as shown below:

On the Title Page

On page 2, Column 2, item (56) under Other Publications, Line 24, delete "Databse" and insert -- Database --, therefor.

On page 2, Column 2, item (56) under Other Publications, Line 45, delete "Tshinghua" and insert -- Tsinghua --, therefor.

In the Specification

In Column 7, Line 57, delete "herein.)" and insert -- herein). --, therefor.

In the Claims

In Column 28, Line 37, in Claim 2, delete "comprises," and insert -- comprises --, therefor.

In Column 30, Line 59, in Claim 15, delete "comprises," and insert -- comprises --, therefor.

In Column 31, Line 31, in Claim 19, after "regarding" delete "one or more", therefor.

In Column 31, Line 36, in Claim 19, after "bits" delete "bitmap", therefor.

Signed and Sealed this
Twenty-first Day of February, 2023

Katherine Kelly Vidal
*Director of the United States Patent and Trademark Office*